(12) United States Patent
Dou et al.

(10) Patent No.: US 11,619,156 B1
(45) Date of Patent: Apr. 4, 2023

(54) HEATER CONTROL FOR ENGINE EXHAUST

(71) Applicant: Deere & Company, Moline, IL (US)

(72) Inventors: Danan Dou, Cedar Falls, IA (US); Eric J. Hruby, Waterloo, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 17/550,308

(22) Filed: Dec. 14, 2021

(51) Int. Cl.
*F01N 3/20* (2006.01)
*F02M 26/33* (2016.01)
*F01N 3/22* (2006.01)
*F01N 9/00* (2006.01)
*F02B 29/04* (2006.01)
*F02M 26/25* (2016.01)

(52) U.S. Cl.
CPC .......... *F01N 3/2046* (2013.01); *F01N 3/208* (2013.01); *F01N 3/2013* (2013.01); *F01N 3/22* (2013.01); *F01N 9/00* (2013.01); *F02M 26/33* (2016.02); *F01N 3/2006* (2013.01); *F02B 29/0418* (2013.01); *F02B 29/0475* (2013.01); *F02B 29/0493* (2013.01); *F02M 26/25* (2016.02)

(58) Field of Classification Search
CPC ...... F01N 3/2046; F01N 3/2013; F01N 3/208; F01N 3/22; F01N 9/00; F01N 3/2006; F02M 26/33; F02M 26/25; F02B 29/0418; F02B 29/0475; F02B 29/0493
See application file for complete search history.

(56) References Cited

U.S. PATENT DOCUMENTS

| 10,550,784 | B2 | 2/2020 | Fulton et al. | |
| 10,975,789 | B2* | 4/2021 | Martz | F02B 29/0418 |
| 2002/0117157 | A1* | 8/2002 | Stephan | F02N 19/04 123/549 |
| 2008/0314028 | A1* | 12/2008 | Christner | F02D 41/0275 60/297 |
| 2009/0077968 | A1* | 3/2009 | Sun | F02B 37/16 60/605.2 |
| 2012/0291760 | A1* | 11/2012 | Vigild | F02M 31/13 123/549 |
| 2014/0047817 | A1* | 2/2014 | Vigild | F02M 26/15 60/273 |
| 2017/0234275 | A1* | 8/2017 | Sellnau | F02M 31/135 123/549 |
| 2019/0155230 | A1* | 5/2019 | Culbertson | F01N 3/208 |

FOREIGN PATENT DOCUMENTS

CN 105715386 B 10/2018

* cited by examiner

*Primary Examiner* — Brandon D Lee
(74) *Attorney, Agent, or Firm* — Tucker Ellis LLP; Evan R. Sotiriou

(57) ABSTRACT

One or more techniques and/or systems are disclosed for controlling exhaust heating to reduce engine out $NO_x$ emission. A heater is used for exhaust temperature control of an exhaust system and is activated at a non-active selective catalytic reduction (SCR) system temperature. One or more exhaust air flow bypasses are controlled during operation of the heater and heating of an exhaust air flow is maintained by the heater prior to activation of the SCR system.

20 Claims, 6 Drawing Sheets

HEATER CONTROL FOR ENGINE EXHAUST

BACKGROUND

Exhaust gas recirculation (EGR) is a vehicle emission control used to reduce nitrogen oxide ($NO_x$) production by recirculating a portion of an engine's exhaust gas back into the engine cylinders. However, during light load or cold start operation, EGR is not used in order to avoid condensation and corrosion issues of power cylinders due to the presence of sulfur and nitrogen oxides in the exhaust. Moreover, during the light load or cold start operation, a selective catalytic reduction (SCR) system that also removes $NO_x$ from engine exhaust is not at an active temperature, and as such, is also not removing $NO_x$ from engine exhaust. Thus, removal of $NO_x$ from engine exhaust during light load and cold start operation is diminished.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems are described herein for heating an exhaust air flow to increase exhaust temperature quickly during cold non-road transient tests, cold starting, and maintaining exhaust temperature during light load operation to reduce engine out $NO_x$ emission when the SCR system has not reached an active temperature. For example, a grid heater or one or more bypasses are controlled to more quickly heat the exhaust air.

In one implementation for exhaust air flow heating, an exhaust system includes a first main pathway and a first bypass pathway, wherein the first main pathway and the first bypass pathway are configured to receive air from an air intake. The exhaust system further includes a second main pathway and a second bypass pathway, wherein the second main pathway and the second bypass pathway are configured to receive recirculated air. The exhaust system also includes a heater configured to heat air received from the air intake, a first bypass configured to redirect the received air from the first main pathway to the first bypass pathway, and a second bypass configured to redirect the recirculated air from the second main pathway to the second bypass pathway. The exhaust system additionally includes a controller configured to activate one or more of the heater, the first bypass, and the second bypass prior to activation of a selective catalytic reduction (SCR) system In another implementation, a method for controlling exhaust heating includes configuring a heater for exhaust temperature control of an exhaust system and activating the heater at a non-active selective catalytic reduction (SCR) system temperature. The method further includes controlling one or more exhaust air flow bypasses during operation of the heater and maintaining heating of an exhaust air flow by the heater prior to activation of the SCR system.

In yet another implementation, an exhaust system includes a heater within an air flow pathway and at least one bypass air flow pathway. The exhaust system further includes a controller configured to activate at least one of the heater and the at least one bypass air flow pathway when a selective catalytic reduction (SCR) system has not reached an active temperature. The heater is configured to reduce engine out $NO_x$ emission when the SCR system has not reached the active temperature.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

The examples disclosed herein may take physical form in certain parts and arrangement of parts, and will be described in detail in this specification and illustrated in the accompanying drawings which form a part hereof and wherein.

DETAILED DESCRIPTION

Figure 1:
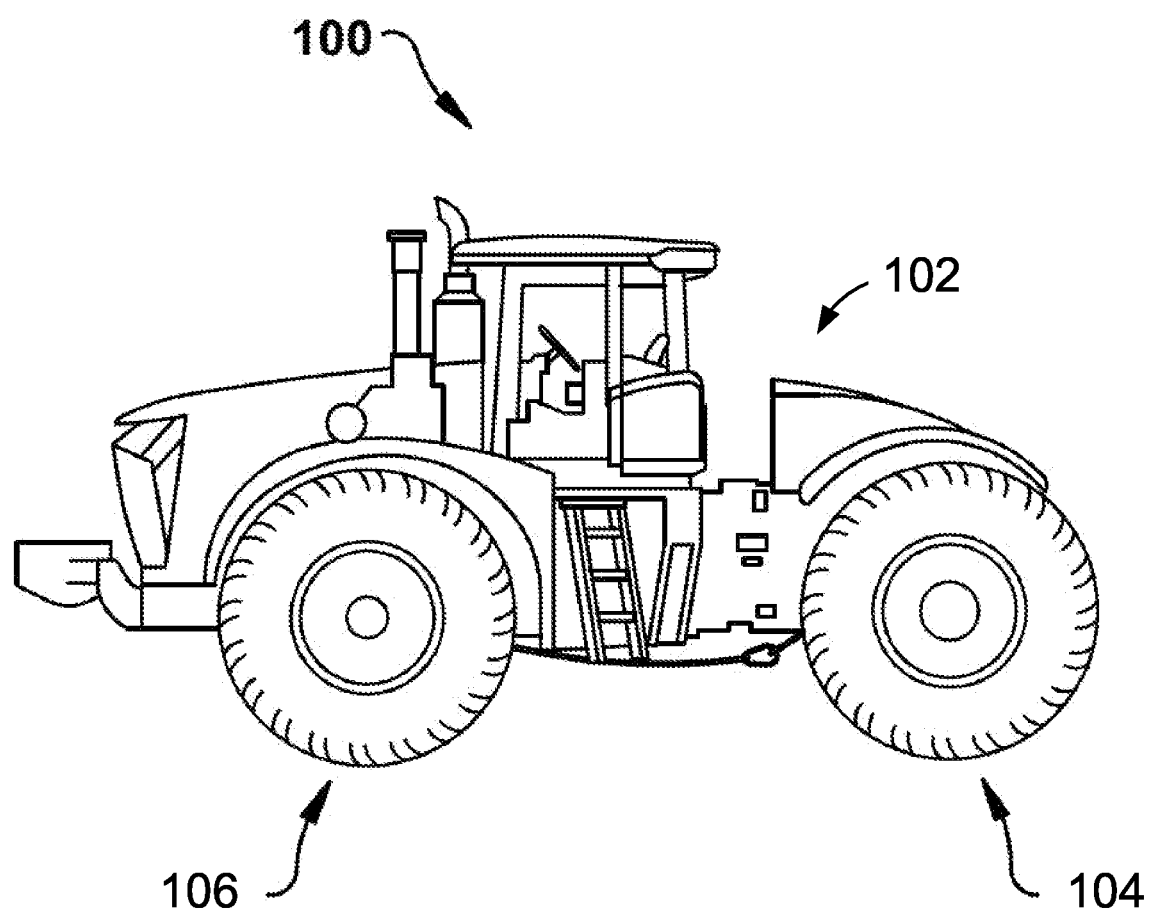
FIG. 1 is a component diagram illustrating an example implementation of a vehicle in which various examples can be implemented.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

The methods and systems disclosed herein, for example, may be suitable for use in different applications, such as for different EGR applications and in different exhaust systems. That is, the herein disclosed examples can be implemented in different engine exhaust systems other than for particular vehicles, such as other than for farm vehicles (e.g., tractors).

FIG. 1 is a component diagram illustrating an example implementation of a system that may utilize one or more portions of the aspects and examples described herein. In the implementation illustrated in FIG. 1, a vehicle 100, such as a tractor, can perform different operations, such as a ground working operation in a field. In some implementations, the vehicle 100 has wheels 104, 106 installed thereon. In other implementations, the vehicle 100 has track systems (not shown) instead of wheels installed on the rear or both the front and rear of the vehicle 100.

The vehicle 100 includes a chassis 102, which provides attachment points for the vehicle 100. For example, a work tool (e.g., a bucket, fork, blade, auger, or hammer) can be connected to the front or back of the chassis 102. The work tool is movably connected to the chassis 102 in some examples.

The vehicle 100 further includes an engine exhaust system having EGR as described in more detail herein. In some examples, an intake grid heater in the engine exhaust system is configured or controlled to increase the intake temperature to thereby increase exhaust temperatures. One or more examples include exhaust temperature management to improve SCR efficiency during light load operation and cold start by allowing EGR flow at the light load operation or cold start without condensation and corrosion issues of the power cylinders. With the herein described examples, EGR flow can be performed earlier, including before the engine coolant temperature reaches 75 degrees Celsius, which typically indicates that the engine has been fully warmed up. One or more examples also increase exhaust temperature quickly during cold non-road transient tests, maintain exhaust temperature during light load operations and reduce engine out $NO_x$ emission when the SCR system has not reached an active temperature, such as 200° C., such that diesel exhaust fluid (DEF) can also be injected in the exhaust system earlier than is normally possible.

It should be noted that while various examples are described in connection with a tractor having a particular configuration, the systems and methods described herein may also be utilized with other types of vehicles and implements. For example, the vehicle may comprise another utility-type vehicle, such as a truck, hauler, semi-tractor, or any vehicle that uses an exhaust gas treatment system, such as any vehicle with a diesel-powered internal combustion engine. For example, one or more herein described aspects can be implemented in a work vehicle, such as a backhoe loader, but may be any work vehicle with an exhaust gas treatment system, such as an articulated dump truck, compact track loader, crawler (e.g., crawler dozer, crawler loader), excavator, feller buncher, forwarder, harvester, knuckleboom loader, motor grader, scraper, skidder, sprayer, skid steer, tractor, tractor loader, and wheel loader, among others. The various examples can also be implemented in other work vehicles, passenger vehicles, or other equipment powered by a diesel engine (e.g., generators, compressors, pumps, and the like).

Figure 2:
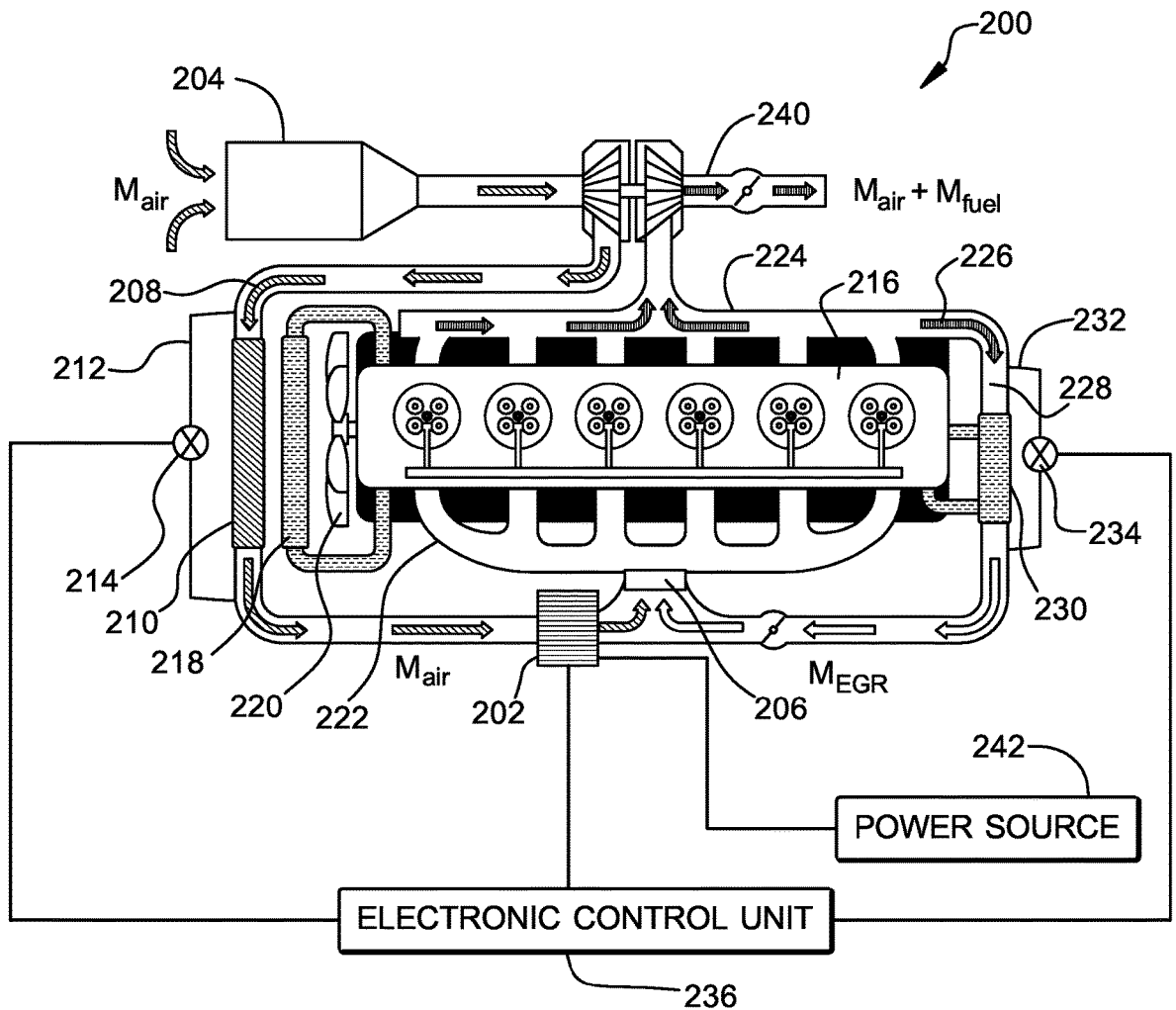
FIG. 2 is a diagram illustrating an exhaust system according to one implementation.

The vehicle 100 in one example is a diesel-powered internal combustion engine vehicle that includes an exhaust system 200 as illustrated in FIG. 2. The exhaust system 200 can be used in any work vehicles, passenger vehicles, or other equipment powered by a diesel engine. The exhaust system 200 includes an exhaust heater, illustrated as a grid heater 202 operable to control a temperature (e.g., increase a temperature) of intake air to reduce engine out $NO_x$ emission, particularly during non-road transient tests, cold start, and/or light load operations. In the illustrated example, an intake air pathway includes an air intake 204 at an inlet configured to receive ambient air ($M_{air}$), which is circulated to an EGR mixer 206 (e.g., a mixer pipe) through the grid heater 202. The intake air is directed through one of two pathways, including a main pathway 208 (which in this example is a first main pathway) through a charge air cooler (CAC) 210 and a bypass pathway 212 (which in this example is a first bypass pathway) through a CAC bypass 214. The CAC 210 is located separate from and forward of an internal combustion engine 216 having a radiator 218 and a fan 220.

In normal engine operation (e.g., when the engine is running and warmed up), the intake air is conducted to an inlet of the CAC 210 by a pipe or conduit forming the main pathway 208. Another pipe or conduit conducts the compressed and cooled intake air from the outlet of the CAC 210 to an intake manifold 222 of the internal combustion engine 216 having the EGR mixer 206. As can be seen, the air from the outlet of the CAC 210 passes through the grid heater 202. As will be described in more detail herein, the intake air can also be conducted through the bypass pathway 212 using the CAC bypass 214 (e.g., a bypass valve), thereby bypassing the CAC 210, such as during light load or cold start operation.

An exhaust manifold 224 of the internal combustion engine 216 allows exhaust from the internal combustion engine 216 to flow to an exhaust pipe 240 and through a recirculation pathway 226. That is, the combustion of the fuel air mixture ($M_{air}+M_{fuel}$) in the internal combustion engine 216 results in combustion byproducts (e.g., carbon dioxide, water vapor, hydrocarbons and oxides of nitrogen). In order to reduce the formation and emission of the combustion byproducts, namely to reduce internal combustion engine emissions, EGR is used, which in this example is illustrated by the recirculation pathway 226. It should be noted that a valve can be employed to control the amount of exhaust gas that is recirculated, and the conditions under which the exhaust gas is allowed to do so.

The recirculated air in the recirculation pathway 226 is directed through one of two pathways, including a main pathway 228 (which in this example is a second main pathway) through an EGR cooler 230 and a bypass pathway 232 (which in this example is a second bypass pathway) through an EGR cooler bypass 234. In normal engine operation, the recirculated air (which is often at a very high temperature) is conducted to an inlet of the EGR cooler 230 (operating as a gas to liquid heat exchanger) by a pipe or conduit forming the main pathway 228 to transfer some of the heat from the exhaust gas to the engine coolant prior to introducing the exhaust gas into the EGR mixer 206. Another pipe or conduit conducts the cooled recirculated air from the outlet of the EGR cooler 230 to the intake manifold 222 of the internal combustion engine 216 having the EGR mixer 206. As will be described in more detail herein, the recirculated air can also be conducted through the bypass pathway 232 using the EGR cooler bypass 234 (e.g., a bypass valve), thereby bypassing the EGR cooler 230, such as during light load or cold start operation.

Thus, the exhaust system 200 is configured for normal operation and bypass operation in some examples. The bypass operation is used, for example, during light load or cold start operation. In various examples, the CAC bypass 214 and the EGR cooler bypass 234 are selectively activated to change the pathway for the intake air and the recirculated air (e.g., redirect the air flow). That is, the bypass pathway 212 selectively allows intake air to bypass the CAC 210 and the bypass pathway 232 selectively allows recirculated air to bypass the EGR cooler 230. In one example, each of the CAC bypass 214 and the EGR cooler bypass 234 include a valve within the main pathway 208 and the main pathway 228, respectively, that can be opened and closed based on control signals received from an electronic control unit (ECU) 236. As such, in operation, air flow can be changed or diverted from the main pathway 208 and the main pathway 228 to the bypass pathway 212 and the bypass pathway 232, respectively. The ECU 236 in various examples further controls operation of the grid heater 202 as described in more detail herein.

It should be noted that as used herein $M_{air}$ refers to the mass of flow of fresh air, MEM refers to the recirculated gas mass flow, and $M_{fuel}$ refers to the mass of flow of fuel products or byproducts. It should also be noted that air flows through the pathways (e.g., passages) in the directions indicated by the arrows.

In the illustrated example, the ECU 236 is configured to control various aspects of the operation of the exhaust system 200, such as to control air flow to the bypass pathway 212 and the bypass pathway 232, as well as operation of the grid heater 202. In some examples, the grid heater 202 is configured and controlled to adjust an exhaust temperature, namely a temperature of circulated air and recirculated air into the internal combustion engine 216 to reduce engine out NOR. It should be noted that the grid heater 202 in some examples is an existing heater (e.g., an existing 12 volt (V) or 24V intake grid heater) used during engine cold starting. In some examples, the grid heater 202 is a different or modified heater (e.g., a modified 12V or 24V intake grid heater, or a 48V heater) configured to generate more heat to reduce engine out NOR as described in more detail herein. In some examples, by controlling the grid heater 202 and/or air flow to the bypass pathway 212 and the bypass pathway 232, SCR efficiency is improved during cold transient emission tests and light load operations. For example, extremely low NOR emission levels are achieved by the engine raising exhaust temperature quickly during cold non-road transient tests, cold starting, and maintaining exhaust temperature during light load operation to reduce engine out NOR emission when the SCR system has not reached an active temperature, such as 200° C., so DEF cannot be injected in the exhaust system 200. In some examples, the use of the grid heater 202 for intake air heating in combination with the EGR cooler bypass 234 and the CAC bypass 214 achieves even faster exhaust temperature rise, particularly for cold NRTC tests and hotter exhaust temperatures at light load engine operations for improved SCR efficiencies.

In one example, the grid heater 202 is configured to operate at temperatures higher than used for engine cold cranking. For example, the grid heater 202 is operable at higher than a 1.1 kW capability for the internal combustion engine 216 being a 4.5 L engine and 1.5 kW for the internal combustion engine 216 being a 13.6 L engine, respectively. The grid heater 202 in various examples is configured having higher power capabilities after the engine has started and the alternator is generating electricity based on the power estimates shown in Table 1, which illustrates the grid heater 202 operating characteristics for different sized internal combustion engines 216. It should be appreciated that the herein disclosed exhaust temperature management can be used in connection with any size internal combustion engine 216.

TABLE 1

|  | 4.5 L | 13.6 L | 13.6 L |
| --- | --- | --- | --- |
| Rated Power, kW | 130 | 450 | 450 |
| Cp of Exhaust Gas, KJ/K/Kg | 1.05 | 1.05 | 1.05 |
| Temp rise | 100 | 60 | 100 |
| Air flow (kg/hr) | 118 | 331 | 331 |
| Power to heat Intake Air kW | 3.4 | 5.8 | 9.7 |

In one example, the grid heater 202 is configured to have two heating modes: (1) a low heating mode for engine cold ambient cranking and (2) a high heating mode for exhaust aftertreatment (AT) heating by raising intake gas temperature after the internal combustion engine 216 reaches stable idle speed and the alternator is active. In one example where the internal combustion engine 216 is a large displacement engine, the grid heater 202 is powered with a power source 242, which is configured as a 48V electric power source, to reduce the conductor cross section. In this example, using a 250 amp (A) current design guideline, a 12V power supply will be limited to 3 kW heating, a 24V power supply for 6 kW heating and a 48V power supply for 12 kW, respectively. Thus, as should be appreciated, for a large internal combustion engine 216, such as a 13.6 L engine, the power source 242 is configured as a 48V power supply. In a configuration having an internal combustion engine 216 that is a 4.5 L engine, the power source 242 is configured as 12V power supply in some examples and a 24V power supply in other examples.

It should be noted that in some examples, the EGR cooler bypass 234 and the CAC bypass 214 are not included. As such, in these examples, the internal combustion engine 216 does not have selectable bypass pathways and only includes the grid heater 202 to perform heating as described in more detail herein. Thus, the EGR cooler bypass 234 and the CAC bypass 214 with the corresponding the bypass pathway 232 and the bypass pathway 212, respectively, are not included in some examples, with the herein described one or more operations performed using only the grid heater 202.

Figure 3:
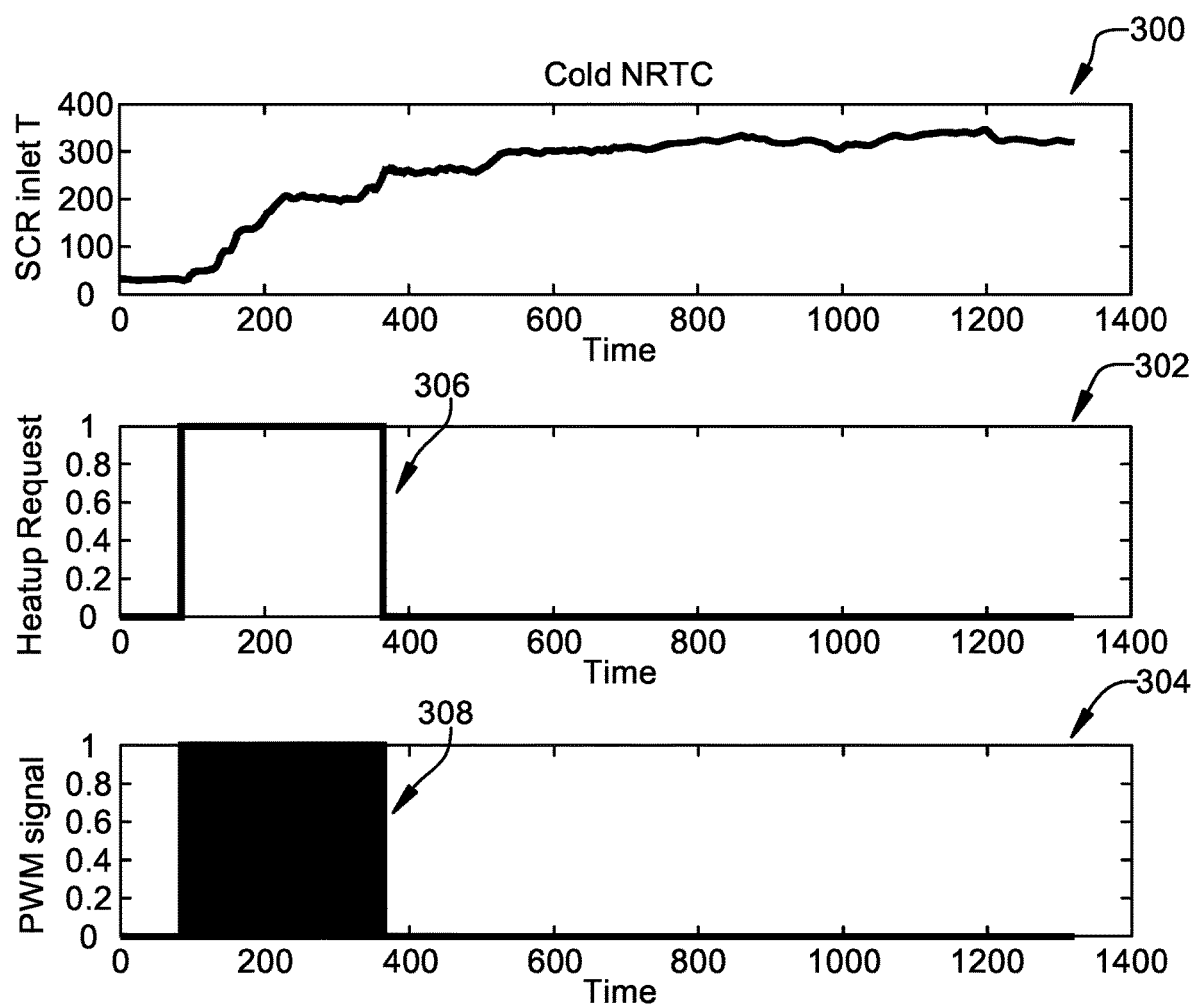
FIG. 3 is a diagram of graphs illustrating control signals according to an implementation.

In one example, exhaust temperature management is performed using a control scheme as illustrated in FIG. 3. The exhaust temperature management is illustrated using graphs 300, 302, and 304 showing a logic flow and demand request due to SCR catalyst temperature. In the graphs 300, 302, and 304, the x-axis represents time in seconds. In the graph 300, the y-axis represents temperature in ° C.; and in the graphs 302 and 304, the y-axis represents a logic unit 1-0. As can be seen, as the SCR inlet temperature begins to increase, a heat-up request signal 306 is initiated, and maintained for a defined time period (in this example, 300 seconds or 5 minutes) as the SCR inlet temperature increases to a defined level (200° C. in this example). In this example, in response to receiving the request signal 306, a control signal, illustrated as a pulse width modulated (PWM) signal 308 is generated, such as by the ECU 236. That is, the ECU 236 generates a signal to activate the grid heater 202 to heat the air flow as described in more detail herein. In some examples, during some or all of the period defined by the heat-up request signal 306, the ECU 236 also generates a signal that commands the CAC bypass 214 and/or the EGR cooler bypass 234 to selectively direct flow through the bypass pathway 212 and the bypass pathway 232, respectively. That is, in response to receiving a command signal from the ECU 236, the CAC bypass 214 and the EGR cooler bypass 234 control respective valves to switch flow from the main pathway 208 and the main pathway 228 to the bypass pathway 212 and the bypass pathway 232, respectively.

It should be appreciated that the timing of the signals 306 and 308 can be varied as desired or needed. For example, the length of time or time period of the signals 306 and 308 can be shorter or longer, can start at a different time, etc. based on engine heating requirements or other requirements. In some examples, the signals 306 and 308 are generated periodically, such as at defined time intervals (e.g., every 4 hours). In some examples, the signals 306 and 308 are generated based on a sensed temperature of the internal combustion engine 216, a temperature at an SCR inlet, or a temperature of the air flow therethrough. In some examples, the signals 306 and 308 are generated based on one or more operating characteristics of the internal combustion engine 216, such as an RPM level, an amount of idle time, etc. Using the exhaust temperature management, in some examples, an EGR window is thereby expanded.

In one example, the grid heater 202 is controlled to increase intake temperature to quickly increase exhaust temperatures, which allows for EGR flow before the internal combustion engine 216 is fully warmed up to further limit engine out NO$_x$ emission before SCR is fully active. It should be noted that heating intake air before EGR is mixed with fresh air is also advantageous to avoid condensation and corrosions to power cylinders. It should also be noted that at light loads, EGR contains a significant amount of oxygen, such that the higher EGR rate will not degrade the combustion quality and PM emission, but the higher intake air temperature improves combustion stability and reduces engine out hydrocarbon emissions.

Heating intake air using the grid heater 202 also provides exhaust temperature management that consumes more electrical power, which assists the internal combustion engine 216 to warm up faster. The elevated exhaust intake temperature also reduces charge air density and effectively reduce A/F ratio, which yields hotter exhaust.

Figure 4:
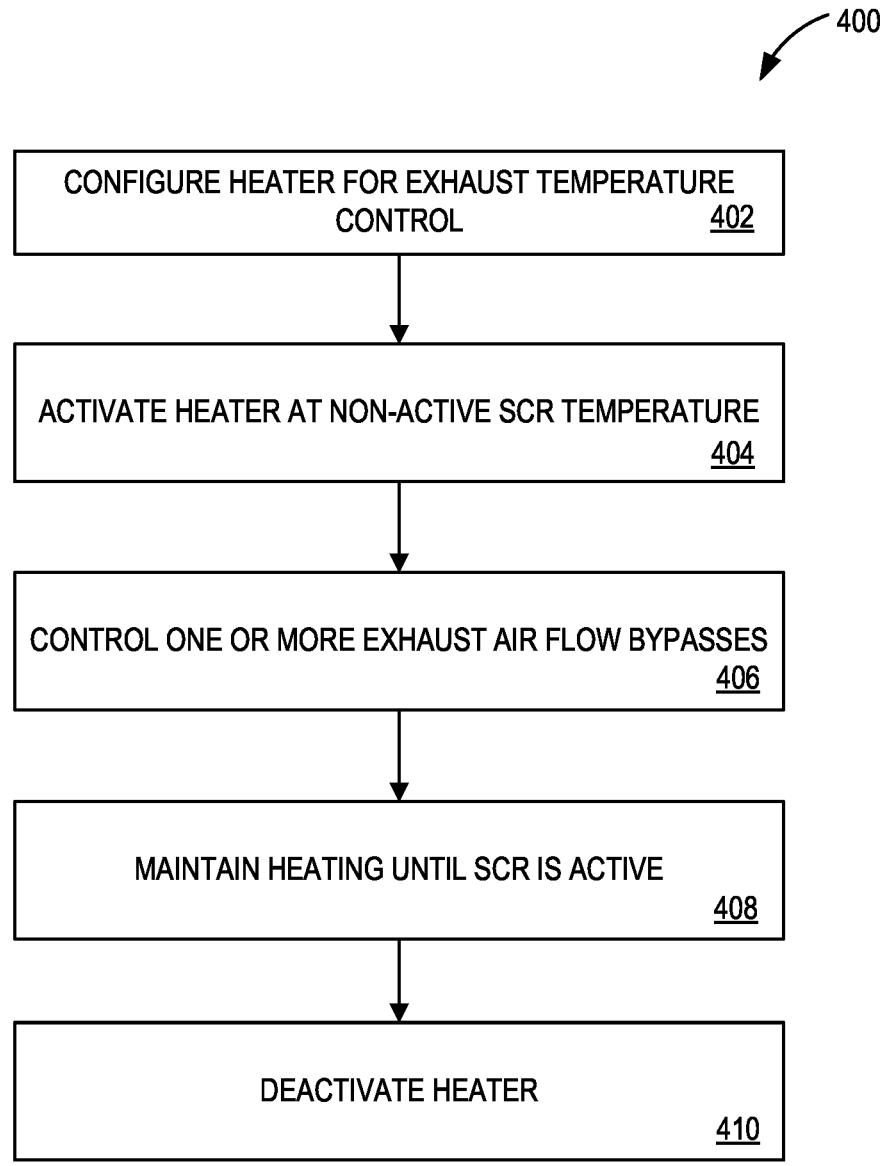
FIG. 4 illustrates an example of a method for controlling heating at an exhaust system according to an implementation

Thus, the ECU 236 is configured to control the exhaust system 200, among other systems. For example, the ECU 236 in some examples is operable to control one or more of the grid heater 202, the CAC bypass 214, and the EGR cooler bypass 234 as illustrated in the flowchart 400 of FIG. 4. That is, the flowchart 400 illustrates operations involved in controlling heating at an exhaust system according to one implementation. In some examples, the operations of the flowchart 400 are performed using the grid heater 202, the CAC bypass 214, and/or the EGR cooler bypass 234 in combination with the other components of the exhaust system 200 described herein. The flowchart 400 commences at operation 402, which includes configuring a heater for exhaust temperature control. In some examples, the heater is the grid heater 202 and is configured to enable EGR flow before the internal combustion engine 216 is fully warmed up to further limit engine out NO$_x$ emission before SCR is fully active. That is, the heater is configured to have a heating capacity or higher than use for cold engine cranking. For example, one or more of power capabilities and/or heating capabilities are configured for engine exhaust heating that reduces engine out NO$_x$ emission by allowing earlier EGR flow. In one example, the engine is configured to have a rated power of 130 kilowatts (kW) for a 4.5 L engine and 450 kW for a 13.6 L engine for selective heating to reduce engine out NO$_x$ emission as described in more detail herein. This configuration is in contrast to a 1.1 kW heater for a 4.5 L engine and 1.5 kW heater for a 13.6 L engine that would be used only to assist in cold engine cranking.

In some examples, the heater of one or more examples is configured to have a higher heating capability or rating and a different physical configuration that allows for increased exhaust heating to reduce engine out NO$_x$ emission. For example, instead of having a heater configured having two heating plates in series, longer or lengthened heating plates are provided as part of the heater and/or parallel heating plates are provided.

In some examples, the heater is configured to have multiple heating units instead of a single heating unit. That is, multiple heating units are configured to be installed in the engine exhaust. Thus, in various examples, configuring the heater can include configuring the heating properties of the heater, as well as the physical configuration or arrangement of the heater to allow for operation in the exhaust system to reduce engine out NO$_x$ emission. That is, the heating properties of the heater are configured, or the heater is selected as part of the configuration process, to be able perform heating to reduce engine out NO$_x$ emission by allowing earlier EGR flow before SCR is active or fully active. In some examples, the heater is configured to have physical properties to allow mounting or arranging the heater to allow for heating to reduce engine out NO$_x$ emission.

At operation 404, the heater is activated at non-active SCR temperatures. For example, as described in more detail herein, the heater is activated to increase exhaust temperature quickly during cold non-road transient tests, cold start operations and/or light load operations to reduce engine out NO$_x$ emission when the SCR system has not reached an active temperature, such as 200° C. That is, the heater is activated to heat exhaust air (including intake air and recirculated air) before DEF can be injected in the exhaust system. As such, engine out NO$_x$ emissions are reduced during time periods where such reduction would not otherwise be possible.

In some examples, one or more exhaust air flow bypasses are additionally or optionally controlled at operation 406. As described herein, the exhaust system in configured to include one or more bypass pathways that allows for quickly or rapidly heating the exhaust air by bypassing elements or components normally operating to cool the air to the engine. For example, the CAC bypass 214 is selectively controllable to bypass the CAC 210 and the EGR cooler bypass 234 is selectively controllable to bypass the EGR cooler 230. That is, the bypasses are selectively controllable to direct air flow through alternate pathways that are not cooled, for example, not cooled by the CAC 210 and/or the EGR cooler 230. As such, a more rapid heating of the exhaust air circulated and recirculated within the exhaust system (e.g., the exhaust system 200) is achieved that reduces engine out NO$_x$ emission, for example, when the SCR system has not reached an active temperature.

The heating by the heater is maintained at operation 408 until the SCR system is active. That is, in some examples, the heater continues to heat the exhaust air until the SCR system is active and operating to reduce engine out NO$_x$ emission (e.g., the SCR system has reached an active temperature). In some examples, the heating is maintained for a period of time that ends before activation of the SCR system or after activation of the SCR system. That is, in some examples there is no overlap between the operation of the heater according to the herein described examples and the SCR system, and in some examples there is overlap (e.g., concurrent operation) between the operation of the heater according to the herein described examples and the SCR system. In some examples, the heating by the heater is maintained until a defined or threshold temperature has been met, such as based on the active temperature of the SCR system.

It should be noted that the activating and maintaining of the heater, including, for example, the duration of heating, the level of heating, the heating scheduled, etc. can be varied as desired or needed (e.g., based on the type of heater, type of exhaust system, type and/or configuration of the SCR system, type of vehicle, etc.). It should also be noted that the control of the one or more exhaust air flow bypasses in some examples is coordinated with the control of the heater. That is, the one or more exhaust air flow bypasses are activated to allow air flow only through the bypass pathways instead of the main pathways during the time period when the heater is active or on. However, in some examples, the one or more exhaust air flow bypasses are activated during a time period that begins before or ends after the active operation of the heater.

After the heater has been active for a period of time (e.g., until the SCR system is activate), the heater is deactivated at operation 410. That is, in some examples, the heater is deactivated when other systems are operational to reduce engine out NO$_x$ emission. The deactivation of the heater can be in response to or based on different factors and/or feedback. For example, the heater is deactivated in one or more examples based on a defined time period or activation of the SCR system. In some examples, based on one or more known properties of the vehicle or components therein, a heating schedule can be used, particularly during cold start operation. It should be appreciated that one or more heating schedules, heating requirements, etc. are stored within a memory in some examples. The heating schedules in various examples include information relating to performing heating using the configured heater, such as when to turn on the heater, how long to maintain the heater on, how long to maintain the heater off, etc.

As should be appreciated, the heating schedule can include any information that facilitates operating the heater to reduce engine out $NO_x$ emission, particularly before SCR operation. In some examples, a table of operating properties or characteristics are set or defined (e.g., control values) based on the type of heater, type of vehicle, type of exhaust, type of the exhaust gas aftertreatment system, heating requirements, etc. As such, a plurality of tables can be stored that define different operating properties or characteristics based on the different parameters. In some examples, for the same vehicle, different heating schedules can be provided based on whether the operation of the heater is at engine startup, engine idle, etc. That is, the operating states of the vehicle can have different heating schedules.

Thus, selective control of the heater and additionally or optionally the one or more air flow bypasses allows for earlier reduction of engine out $NO_x$ emission. That is, engine out $NO_x$ emission reduction can be performed during cold start operation and/or idle operation (or light load operation) when the engine temperature is not high enough to allow operation of the SCR system.

Figure 5:
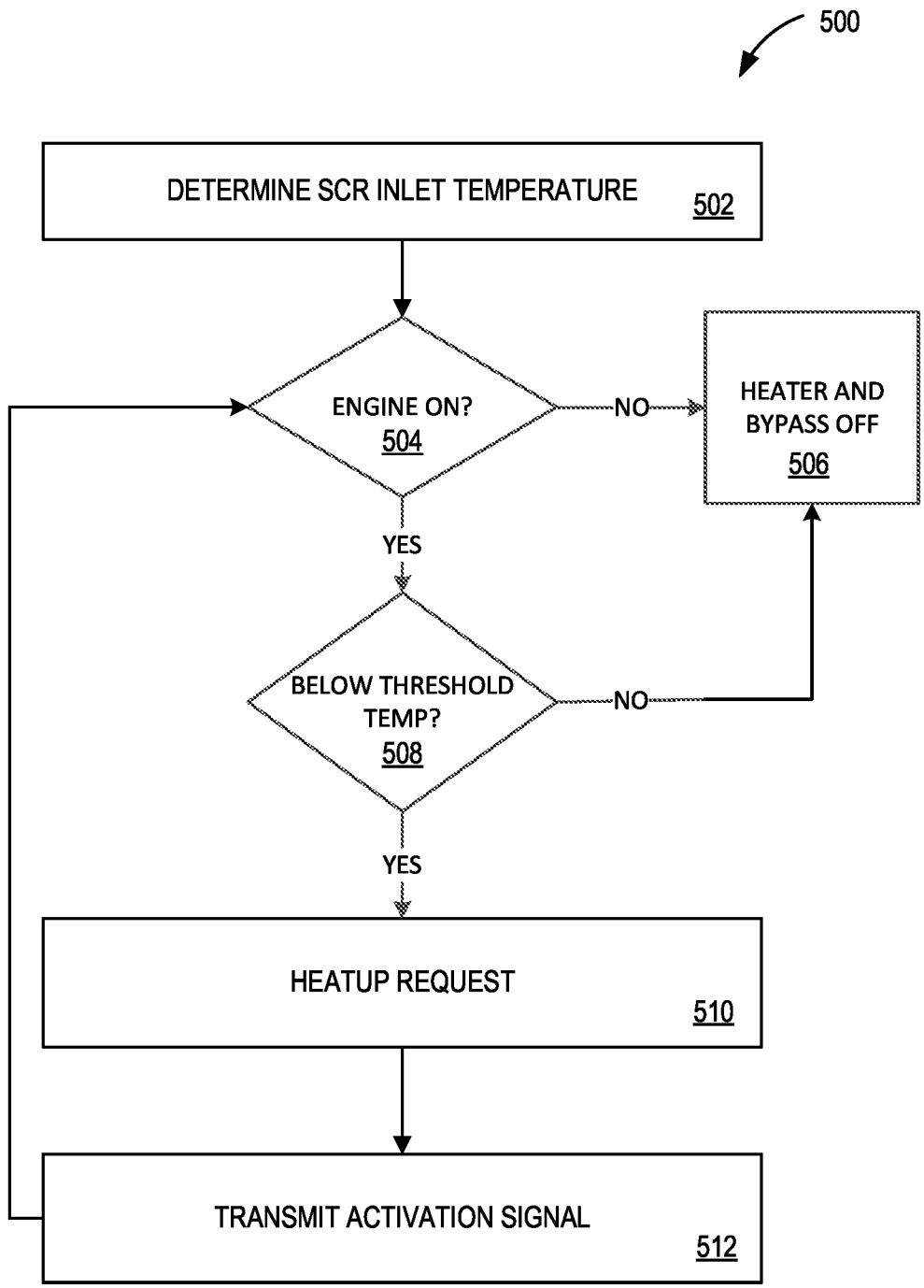
FIG. 5 illustrates an example of a method for generating one or more control signals for controlling heating at an exhaust system according to an implementation

The ECU 236 in various examples is configured to control the exhaust system 200, among other systems, as illustrated in the flowchart 500 of FIG. 5. For example, the ECU 236 in some examples is operable to generate one or more control signals to control one or more of the grid heater 202, the CAC bypass 214, and the EGR cooler bypass 234 as illustrated in the flowchart 500 of FIG. 5. That is, the flowchart 500 illustrates operations involved in generating one or more control signals for controlling heating at an exhaust system according to one implementation. In some examples, the operations of the flowchart 500 generate signals to control operation of the grid heater 202, the CAC bypass 214, and/or the EGR cooler bypass 234 in combination with the other components of the exhaust system 200 described herein. The flowchart 500 commences at operation 502, which includes determining an SCR inlet temperature. For example, using temperature information from one or more sensors, the SCR inlet temperature is determined. It should be noted that the temperature at the SCR inlet can be determined directly or indirectly. That is, in some examples the SCR inlet temperature is determined directly based on a temperature sensor reading at or near the SCR inlet, while in other examples the SCR inlet temperature is determined indirectly based on a sensed engine temperature, a sensed exhaust temperature, activation of the SCR system, etc. It should be appreciated that the SCR inlet temperature can be determined using any direct or indirect method that allows for a determination of whether the SCR can be or is active, such as based on one or more determinations or readings by the ECU 236, which may or may not be directly related to the exhaust system and/or SCR system operation and control.

At operation 504, a determination is made whether the engine is on. For example, a determination is made whether the engine has just been turned on (e.g., cold start operation) or is on (e.g., idle operation). The determination of whether the engine is on can be determined by the ECU 236 using any suitable method, such as based on any engine or exhaust control technique or feedback information received by the ECU 236. If the engine is determined not to be on, then a heater (e.g., the grid heater 202) and/or one or more bypasses (e.g., CAC bypass 214 and EGR cooler bypass 234) as described in more detail herein are off at operation 506. That is, the heater and/or one or more bypasses are maintained off or turned off when the engine is off. If the engine is determined to be on, at operation 508 a determination is made as to whether SCR inlet temperature is below a threshold temperature. That is, a determination is made whether the SCR inlet temperature determined at 502 is below the threshold temperature. In some examples, the threshold temperature is the temperature at which the SCR system begins to operate. However, the threshold temperature can be at a level above or below the SCR system activation temperature, such that there is no overlap or overlap, respectively, with the operation of the heater and the SCR system as described in more detail herein.

If a determination is made at operation 508 that the temperature is not below the threshold temperature, then the heater (e.g., the grid heater 202) and/or one or more bypasses (e.g., CAC bypass 214 and EGR cooler bypass 234) as described in more detail herein are off at operation 506. That is, the heater and/or one or more bypasses are maintained off or turned off when the SCR inlet temperature is not below the threshold temperature. It should be noted that in some examples, the heater and/or one or more bypasses are maintained or turned off concurrently with the activation or on state of the SCR system.

If a determination is made at operation 508 that the temperature is below the threshold temperature, then a heat-up request is made at 510. That is, in some examples, a request to initiate exhaust heat-up is made, such as by generating the heat-up request signal 306 (shown in FIG. 3). For example, a heat-up request on state is initiated indicating that the heater in the exhaust system is to be turned on and the air flow in the exhaust system redirected to one or more the bypass pathways as described in more detail herein. The heat-up request in some examples is a signal that identifies the start and stop of the heat-up request, as well as the duration of the request. That is, in some examples, the heat-up request is maintained in an on or active signal state during a time in which exhaust heat-up as described in more detail herein is to be performed.

In response to the heat-up request, one or more activation signals are generated at operation 512. For example, one or more control signals are generated to activate the heater and/or the one or more bypasses as described in more detail herein. The activation signals in some examples are generated by the ECU 236 and transmitted to the heater and/or one or more bypasses to initiate activation thereof. That is, in response to receiving the activation signal, the heater turns on and/or the one or more bypasses redirect air flow within the exhaust from the main pathway(s) to the bypass pathway(s) as described in more detail herein.

Thereafter, a determination is again made as to whether the engine is on at operation 504 and whether the SCR inlet temperature is below the threshold temperature at operation 508. That is, in some examples, exhaust heat activation conditions are monitored to determine whether the exhaust heating system described herein is to be active or inactive.

Thus, the flowchart 500 illustrates a method of generating control signals for exhaust temperature management. In various examples, the exhaust temperature management is a more "aggressive" management approach that allows for earlier engine out $NO_x$ emission. That is, various examples implement intake heating as an exhaust temperature method for light load operation, cold transient tests and idle. As described in more detail herein, direct heating of the intake air using the grid heater 202 and/or the CAC bypass 214 and/or the EGR cooler bypass 234 yields a hotter exhaust temperature quickly. The heating approach described herein also reduces charge air density, effectively reducing the A/F ratio, which will yield hotter exhaust temperature. Additionally, one or more examples consume electric energy and increase engine load to the alternator, which increases exhaust temperature and exhaust flow rate with more enthalpy to warm up aftertreatment.

As described herein, one or more examples enable flow of EGR and a higher EGR rate before the engine is fully warmed up to avoid power cylinder condensation and maximally reduce engine out $NO_x$ before the SCR system is active. It should be noted that heating intake air also improves combustion stability, reduces engine out HC emissions, and reduces misfire risk. Moreover, combined with the EGR cooler and/or charge air cooler bypass, faster SCR warm up is achieved and the A/F ratio reduced, thereby yielding hotter exhaust and reduced engine out NOR.

Figure 6:
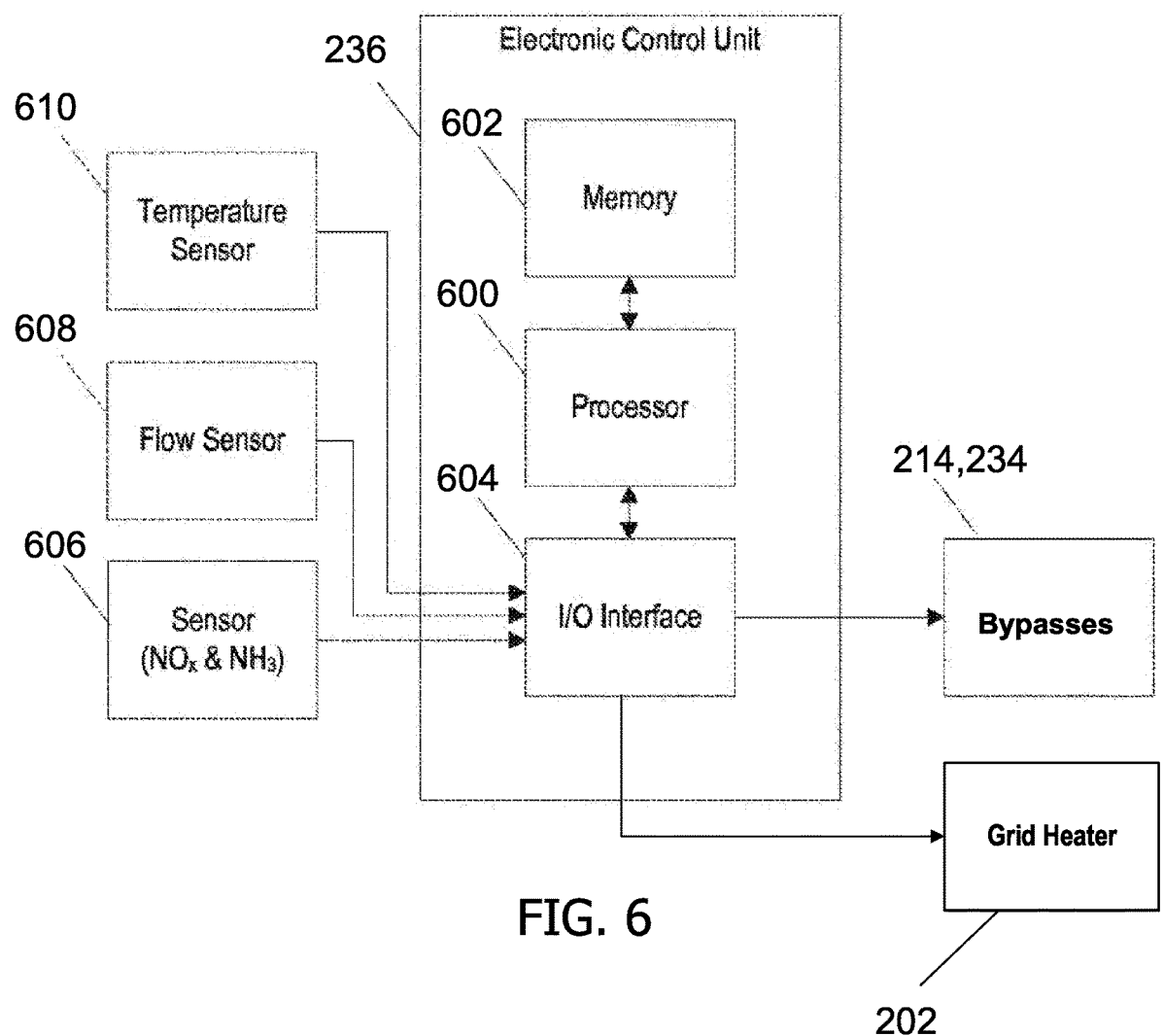
FIG. 6 is a block diagram of an electronic control unit usable with the exhaust system of FIG. 2.

FIG. 6 illustrates an example of the ECU 236 for controlling one or more components of the exhaust system 200, such as the grid heater 202 and/or the bypasses 214 and 234. The ECU 236 includes a plurality of electrical and electronic components that provide power, operational control, and protection to the components and modules within the ECU 236. In particular, the ECU 236 includes, among other things, an electronic processor 600 (e.g., a programmable microprocessor, microcontroller, or similar device), non-transitory, machine-readable memory 602, and an input/output interface 604. The electronic processor 600 is communicatively coupled to the memory 602. The electronic processor 600 is configured to retrieve from the memory 602 and execute, among other things, instructions related to the control processes and methods described herein, such as to control the heating or the exhaust air flow. In some examples, the ECU 236 includes additional, fewer, or different components. The ECU 236 may also be configured to communicate with external systems including, for example, engine controls and/or operator controls.

The ECU 236 in the illustrated example is communicatively coupled to a sensor 606 (for sensing NOR and ammonia), other sensors, such as a flow sensor 608, a temperature sensor 610, the grid heater 202, and the bypasses 214 and 234. The ECU 236 in some examples receives a signal input from the sensor 606 indicative of the amount of NOR and ammonia present in the exhaust gas, a signal from the flow sensor 608 indicative of an air flow rate, and a signal from the temperature sensor 610 indicative of a temperature, which in some examples is a temperature of the SCR inlet. The input/output interface 604 facilitates communication between the ECU 236 and the grid heater 202 and the bypasses 214 and 234. Through the input/output interface 604, the ECU 236 is configured to control the operation (e.g., turning on and off) of the grid heater 202 and the bypasses 214 and 234 as described in more detail herein. The input/output interface 604 also coordinates input communications to the ECU 236 from the sensors 606, 608, and 610.

Thus, the ECU 236 is configured to control one or more components of the exhaust system 200, among other systems. For example, the ECU 236 in some examples is operable to control the grid heater 202 and the bypasses 214 and 234 as illustrated in the flowcharts 400 and 500 of FIGS. 4 and 5, respectively.

It should be noted that the memory 602 in some examples includes any computer-readable media. In one example, the memory 602 is used to store and access instructions configured to carry out the various operations disclosed herein. In some examples, the memory 602 includes computer storage media in the form of volatile and/or nonvolatile memory, removable or non-removable memory, data disks in virtual environments, or a combination thereof. In one example, the processor(s) 600 includes any quantity of processing units that read data from various entities, such as the memory 602. Specifically, the processor(s) 600 are programmed to execute computer-executable instructions for implementing aspects of the disclosure. In one example, the instructions are performed by the processor(s) 600 and the processor 600 is programmed to execute instructions such as those illustrated in the flowcharts discussed herein and depicted in the accompanying drawings.

It should also be noted that computer readable media comprises computer storage media and communication media. Computer storage media include volatile and non-volatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se.

While various spatial and directional terms, including but not limited to top, bottom, lower, mid, lateral, horizontal, vertical, front and the like are used to describe the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Various operations of implementations are provided herein. In one implementation, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each implementation provided herein.

Any range or value given herein can be extended or altered without losing the effect sought, as will be apparent to the skilled person.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

As used in this application, the terms "component," "module," "system," "interface," and the like are generally intended to refer to a computer-related entity, either hardware, a combination of hardware and software, software, or software in execution. For example, a component may be, but is not limited to being, a process running on a processor, a processor, an object, an executable, a thread of execution, a program and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device, carrier or media. Of course, those skilled in the art will recognize many modifications may be made to this configuration without departing from the scope or spirit of the claimed subject matter.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. An exhaust system, comprising:
    a first main pathway;
    a first bypass pathway, the first main pathway and the first bypass pathway configured to receive air from an air intake;
    a second main pathway;
    a second bypass pathway, the second main pathway and the second bypass pathway configured to receive recirculated air;
    a heater configured to heat air received from the air intake;
    a first bypass valve configured to redirect the received air from the first main pathway to the first bypass pathway;
    a second bypass valve configured to redirect the recirculated air from the second main pathway to the second bypass pathway; and
    a controller configured to activate one or more of the heater, the first bypass valve, and the second bypass valve prior to activation of a selective catalytic reduction (SCR) system, wherein the heater is configured to have a low heating mode for engine cold ambient cranking and a high heating mode for exhaust aftertreatment (AT) heating by raising intake gas temperature, and the controller is further configured to control the heater to operate in the low heating mode and the high heating mode.

2. The system of claim 1, wherein the first bypass pathway is a charge air cooler (CAC) bypass.

3. The system of claim 1, wherein the second bypass pathway is an exhaust gas recirculation (EGR) cooler bypass.

4. The system of claim 1, wherein the heater is a grid heater having a power rating of at least 1 kW and in the low heating mode the controller is configured to control the heater by raising intake gas temperature after an internal combustion engine reaches stable idle speed and an alternator is active.

5. The system of claim 1, wherein the controller is configured to activate the heater during one of a non-road transient test, a cold start, and a light load operation.

6. The system of claim 1, wherein the controller is configured to initiate EGR flow prior to an engine warmup condition.

7. The system of claim 1, wherein the controller is configured to independently control the heater, the first bypass valve, and the second bypass valve.

8. A method for controlling exhaust heating, the method comprising:
    configuring a heater for exhaust temperature control of an exhaust system;

activating the heater at a non-active selective catalytic reduction (SCR) system temperature;

controlling one or more exhaust air flow bypasses during operation of the heater using a controller configured to control the heater to operate in a low heating mode for engine cold ambient cranking and a high heating mode for exhaust aftertreatment (AT) heating by raising intake gas temperature; and maintaining heating of an exhaust air flow by the heater prior to activation of the SCR system.

9. The method of claim 8, further comprising activating the heater and maintaining the heating in response to a heat-up request signal, the heat-up request signal generated during one of a non-road transient test, a cold start, and a light load operation.

10. The method of claim 9, further comprising transmitting a control signal to at least one of the heater and the one or more exhaust air flow bypasses in response to the heat-up request signal, the control signal comprising a pulse width modulated signal.

11. The method of claim 8, further comprising determining an SCR inlet temperature and in response to the determined SCR inlet temperature being below a threshold temperature, activating the heater and controlling the one or more exhaust air flow bypasses.

12. The method of claim 11, further comprising determining an engine connected to the exhaust system is operating, and in response, determining whether the SCR inlet temperature is below the threshold temperature.

13. The method of claim 11, wherein the threshold temperature is 200° C.

14. The method of claim 8, wherein configuring the heater comprises using a grid heater having a power rating of at least 1 kW.

15. The method of claim 8, wherein the one or more exhaust air flow bypasses comprise a bypass configured as a charge air cooler (CAC) bypass.

16. The method of claim 8, wherein the one or more exhaust air flow bypasses comprise a bypass configured as an exhaust gas recirculation (EGR) cooler bypass.

17. The method of claim 8, wherein controlling the one or more exhaust air flow bypasses comprises controlling one or more air flow valves to redirect air flow from one or more main pathways to one or more bypass pathways.

18. The method of claim 8, further comprising deactivating the heater at an active SCR system temperature.

19. An exhaust system, comprising:
a heater within an air flow pathway;
at least one bypass air flow pathway; and
a controller configured to activate at least one of the heater and the at least one bypass air flow pathway when a selective catalytic reduction (SCR) system has not reached an active temperature, wherein the heater is configured to have a low heating mode for engine cold ambient cranking and a high heating mode for exhaust aftertreatment (AT) heating by raising intake gas temperature, the controller is further configured to control the heater to operate in the low heating mode and the high heating mode, and the heater is controlled to reduce engine out $NO_x$ emission when the SCR system has not reached the active temperature.

20. The exhaust system of claim 19, wherein the heater has a power rating exceeding a power rating for cold cranking heating.

* * * * *